United States Patent
Liu et al.

(10) Patent No.: US 10,893,121 B2
(45) Date of Patent: Jan. 12, 2021

(54) VIRTUAL SUBSCRIBER IDENTITY MODULE FOR MOBILE COMMUNICATION DEVICE

(71) Applicant: SIMO Holdings Inc., Grand Cayman (KY)

(72) Inventors: Jing Liu, Sunnyvale, CA (US); Wei Ren, Guangdong (CN); Chao Wang, Guangdong (CN); Xiaolei Qin, Guangdong (CN)

(73) Assignee: SIMO Holdings Inc., Grand Cayman (KY)

( * ) Notice: Subject to any disclaimer, the term of this patent is extended or adjusted under 35 U.S.C. 154(b) by 0 days.

(21) Appl. No.: 15/480,200

(22) Filed: Apr. 5, 2017

(65) Prior Publication Data
US 2017/0215137 A1 Jul. 27, 2017

Related U.S. Application Data

(62) Division of application No. 15/148,974, filed on May 6, 2016, now Pat. No. 10,084,879.
(Continued)

(51) Int. Cl.
*H04L 29/08* (2006.01)
*H04W 12/00* (2009.01)
(Continued)

(52) U.S. Cl.
CPC ............ *H04L 67/303* (2013.01); *H04W 4/00* (2013.01); *H04W 8/183* (2013.01);
(Continued)

(58) Field of Classification Search
CPC .... H04L 67/303; H04W 8/183; H04W 76/10; H04W 48/18; H04W 4/00; H04W 12/06;
(Continued)

(56) References Cited

U.S. PATENT DOCUMENTS 6,603,968 B2   8/2003   Anvekar et al.
6,836,670 B2   12/2004  Castrogiovanni et al.
(Continued)

FOREIGN PATENT DOCUMENTS

DE   10311980 A1   9/2004
EP   0562890 A1    9/1993
(Continued)

OTHER PUBLICATIONS

U.S. Appl. No. 60/891,894, filed Feb. 27, 2007, Liu.
(Continued)

*Primary Examiner* — George Eng
*Assistant Examiner* — Hung K Du
(74) *Attorney, Agent, or Firm* — K&L Gates LLP; Jordan A. Kwan (57) ABSTRACT

A system includes a subscriber identity module (SIM) application; a physical SIM driver configured to be coupled to a physical SIM card; a simulated SIM driver; a control switch that selectively couples the SIM application to the physical SIM driver or the simulated SIM driver, wherein the SIM application, when coupled to the physical SIM driver, is configured to read and write on the physical SIM card; and a SIM simulator in communication with the control switch and the simulated SIM driver, wherein the SIM simulator is configured to control the selective coupling of the control switch, and is configured to receive at least one request comprising an authentication request from the simulated SIM driver and transmit at least one response comprising an authentication response to the simulated SIM driver.

15 Claims, 9 Drawing Sheets

Related U.S. Application Data (60) Provisional application No. 62/158,984, filed on May 8, 2015.

(51) Int. Cl.

| | | |
|---|---|---|
| *H04W 76/10* | (2018.01) | |
| *H04W 12/06* | (2009.01) | |
| *H04W 4/60* | (2018.01) | |
| *H04W 48/18* | (2009.01) | |
| *H04M 1/675* | (2006.01) | |
| *H04W 4/00* | (2018.01) | |
| *H04W 8/18* | (2009.01) | |
| *H04W 8/20* | (2009.01) | |

(52) U.S. Cl.
CPC . *H04W 12/0023* (2019.01); *H04W 12/00401* (2019.01); *H04W 12/00405* (2019.01); *H04W 12/06* (2013.01); *H04W 76/10* (2018.02); *H04M 1/675* (2013.01); *H04W 4/60* (2018.02); *H04W 8/205* (2013.01); *H04W 12/00407* (2019.01); *H04W 48/18* (2013.01)

(58) Field of Classification Search
CPC ....... H04W 12/0023; H04W 12/00405; H04W 12/00401; H04W 12/00407; H04W 8/205; H04W 4/60; H04M 1/675
See application file for complete search history.

(56) References Cited

U.S. PATENT DOCUMENTS

| | | | |
|---|---|---|---|
| 6,892,070 B2 | 5/2005 | Warrier et al. | |
| 7,039,027 B2 | 5/2006 | Bridgelall | |
| 7,117,428 B2 | 10/2006 | Oppold et al. | |
| 7,236,781 B2 | 6/2007 | Patil et al. | |
| 7,280,847 B2 | 10/2007 | Goldthwaite et al. | |
| 7,289,805 B2 | 10/2007 | Tom et al. | |
| 7,366,551 B1 | 4/2008 | Hartley | |
| 7,379,754 B2 | 5/2008 | Sharma | |
| 7,496,344 B2 | 2/2009 | Stadelmann et al. | |
| 7,613,454 B2 | 11/2009 | Zhang | |
| 7,882,346 B2 | 2/2011 | O'Neill et al. | |
| 8,116,735 B2 | 2/2012 | Liu et al. | |
| 8,208,898 B2 | 6/2012 | Huang et al. | |
| 8,503,358 B2 | 8/2013 | Hanson et al. | |
| 8,666,368 B2 | 3/2014 | Schell et al. | |
| 9,226,148 B2 | 12/2015 | Heutschi et al. | |
| 9,578,501 B2 | 2/2017 | Barker | |
| 9,736,689 B2 | 8/2017 | Liu et al. | |
| 9,788,189 B2 | 10/2017 | Stein | |
| 2002/0012433 A1* | 1/2002 | Haverinen | H04L 63/08 380/247 |
| 2002/0136226 A1 | 9/2002 | Christoffel et al. | |
| 2003/0051041 A1 | 3/2003 | Kalavade et al. | |
| 2003/0139180 A1 | 7/2003 | McIntosh et al. | |
| 2004/0072591 A1 | 4/2004 | Andreini | |
| 2004/0176134 A1 | 9/2004 | Goldthwaite et al. | |
| 2004/0229601 A1 | 11/2004 | Zabawskyj et al. | |
| 2005/0083846 A1 | 4/2005 | Bahl | |
| 2005/0102519 A1 | 5/2005 | Morper | |
| 2005/0177733 A1 | 8/2005 | Stadelmann et al. | |
| 2006/0059393 A1 | 3/2006 | Oppold et al. | |
| 2006/0089140 A1 | 4/2006 | Zhang | |
| 2006/0262743 A1 | 11/2006 | Kalhan et al. | |
| 2006/0276226 A1 | 12/2006 | Jiang | |
| 2006/0291454 A1 | 12/2006 | Ali | |
| 2007/0070935 A1 | 3/2007 | Prakash et al. | |
| 2007/0167161 A1 | 7/2007 | Cheng et al. | |
| 2008/0020755 A1 | 1/2008 | Liu | |
| 2009/0011759 A1 | 1/2009 | Alperovich et al. | |
| 2009/0163175 A1 | 6/2009 | Shi et al. | |
| 2009/0215449 A1 | 8/2009 | Avner | |
| 2009/0225736 A1 | 9/2009 | Patarkazishvili | |
| 2010/0135491 A1 | 6/2010 | Bhuyan | |
| 2011/0053640 A1 | 3/2011 | Bennett et al. | |
| 2012/0108294 A1* | 5/2012 | Kaul | G06K 7/0013 455/558 |
| 2012/0108295 A1 | 5/2012 | Schell et al. | |
| 2012/0129513 A1 | 5/2012 | Van Der Laak | |
| 2013/0065557 A1 | 3/2013 | Zhang et al. | |
| 2013/0130676 A1 | 5/2013 | Manso | |
| 2013/0329639 A1 | 12/2013 | Wietfeldt | |
| 2014/0051422 A1* | 2/2014 | Mittal | H04W 8/18 455/419 |
| 2014/0342715 A1* | 11/2014 | Gu | G06F 9/455 455/418 |
| 2015/0004940 A1 | 1/2015 | Zhang et al. | |
| 2015/0017950 A1 | 1/2015 | Zhao et al. | |
| 2015/0071139 A1* | 3/2015 | Nix | H04W 4/70 370/311 |
| 2015/0201325 A1 | 7/2015 | Bai et al. | |
| 2015/0373530 A1 | 12/2015 | Stein | |
| 2016/0157168 A1* | 6/2016 | Xue | H04W 4/029 370/329 |
| 2016/0323256 A1* | 11/2016 | Shahidi | H04L 63/18 |
| 2016/0374014 A1 | 12/2016 | Anyuru | |

FOREIGN PATENT DOCUMENTS

| | | |
|---|---|---|
| EP | 1622335 A1 | 2/2006 |
| EP | 1703760 A2 | 9/2006 |
| EP | 1748670 A1 | 1/2007 |
| EP | 1850607 A2 | 10/2007 |
| EP | 1625768 B1 | 11/2007 |
| EP | 2773140 A1 | 9/2014 |
| EP | 2903389 A1 | 8/2015 |
| GB | 2371184 B | 5/2005 |
| WO | WO 2003/013173 | 2/2003 |
| WO | WO 2003/077585 | 9/2003 |
| WO | WO 2003/084265 A1 | 10/2003 |
| WO | WO 2003/096661 | 11/2003 |
| WO | WO 2004/097590 A2 | 11/2004 |
| WO | WO 2004/105421 A3 | 12/2004 |
| WO | WO 2005/094011 | 10/2005 |
| WO | WO 2006/094564 A1 | 9/2006 |
| WO | WO 2006/121894 | 11/2006 |
| WO | WO2014/048130 A1 | 4/2014 |
| WO | WO 2014/122588 A1 | 8/2014 |
| WO | WO2014/122588 A1 | 8/2014 |

OTHER PUBLICATIONS

3rd Generation Partnership Project, 3GPP TS 43.020: "Technical Specification Group Services and System Aspects; Security related network functions.", pp. 1-96, Nov. 2000.
3rd Generation Partnership Project, 3GPP TS 51.011: "Technical Specification Group Terminals; Specification of the Subscriber Identity Module—Mobile Equipment (SIM-ME) interface Technical Specification Group Terminals." pp. 1-172, Jun. 2005.
3rd Generation Partnership Project, 3GPP TS 51.014: "Specification of the SIM Application Toolkit for the Subscriber Identity Module—Mobile Equipment (SIM-ME) interface.", pp. 1-85, Dec. 2004.
International Search Report and Written Opinion for International Application No. PCT/US2016/031341 dated Aug. 18, 2016 (11 pages).
International Search Report and Written Opinion for International Application No. PCT/US09/033628 dated Apr. 7, 2009, 11 pages.
Liang, Wei, et al., "A Local Authentication Control Scheme Based on AAA Architecture in Wireless Networks" by Wei Liang and Wenye Wang, IEEE 2004, pp. 5276-5280.
SIM Access Profile, Interoperability Specification, of the Bluetooth Specification, Revision v10; Dated: May 12, 2005, 56 pages.
SIM Access Profile, Interoperability Specification, of the Bluetooth Specification, Revision v11; Dated: Dec. 18, 2008, 51 pages.
Zhang, Shaobo, "Proposal for Localized Roaming Service" (S1-022087), Nov. 11-15 meeting in Busan, Korea, 6 pages.

\* cited by examiner

VIRTUAL SUBSCRIBER IDENTITY MODULE FOR MOBILE COMMUNICATION DEVICE

RELATED APPLICATIONS

This application is a divisional application of U.S. patent application Ser. No. 15/148,974 filed on May 6, 2016 and titled "Virtual Subscriber Identity Module for Mobile Communication Device," which claims the benefit under 35 U.S.C. § 119(e) of the earlier filing date of U.S. Provisional Patent Application No. 62/158,984 filed on May 8, 2015 and titled "Virtual SIM Technology," the contents of both applications are hereby incorporated by reference in their entirety.

TECHNICAL FIELD

The present disclosure is related generally to mobile communication systems. In particular, the present disclosure is related to a virtual subscriber identity module for mobile communication devices.

BACKGROUND

Presently, mobile communication devices utilize a variety of technologies and formats, which may include, for example, GSM (Global System for Mobile Communication), CDMA (Code Division Multiple Access), and/or UMTS (Universal Mobile Telecommunications System) technologies depending on the service provider of choice. In order to store the necessary provisioning data that allows the mobile device to communicate with a wireless communications network, GSM and UMTS mobile devices utilize a Subscriber Identity Module ("SIM"), commonly known as a SIM Card.

By utilizing SIM Cards, a user may select a service provider to use based upon which service provider will provide the optimal service for the user's specific need. Then the user may simply replace the current SIM Card with the SIM Card of the desired service provider on a per-usage basis. By carrying multiple SIM Cards, each containing the provisioning information of a different service provider, a user may switch service providers simply by physically switching SIM Cards.

SUMMARY

With the virtual SIM technology described herein in connection with the present disclosure, users will be able to use the best service available from different service providers without purchasing and switching physical SIM Cards.

The described aspects apply to mobile and wireless communication devices, including cellular telephones, smartphones, tablets, mobile hotspots, laptop computers, palmtop computers, Ultra-Mobile Personal Computers (UMPC), PDA, dual-mode (tele- and data-communications) phones, and other devices capable of voice and/or data communications like text messaging, Internet browsing, etc, such as a Blackberry® handheld device or portable computer. Embodiments of the present disclosure makes wireless communication clients more convenient and less expensive to operate in a multitude of geographic locations, such as in different countries, different regions within a large country, or where different communications technologies are required, such as CDMA and GSM.

In one aspect, a system comprises a SIM application; a physical SIM driver configured to be coupled to a physical SIM card; a simulated SIM driver; a control switch that selectively couples the SIM application to the physical SIM driver or the simulated SIM driver, wherein the SIM application, when coupled to the physical SIM driver, is configured to read and write on the physical SIM card; and a SIM simulator in communication with the control switch and the simulated SIM driver, wherein the SIM simulator is configured to control the selective coupling of the control switch, and is configured to receive at least one request comprising an authentication request from the simulated SIM driver and transmit at least one response comprising an authentication response to the simulated SIM driver.

In another aspect, the control switch and the simulated SIM driver are implemented at a MODEM, and the SIM simulator is implemented at an application processor.

In another aspect, the SIM simulator is in communication with the control switch and the simulated SIM driver via Remote Procedure Call.

In another aspect, the system further comprises an application module implemented at the application processor, wherein the application module is configured to control the functionality of the SIM simulator.

In another aspect, the system further comprises an interface module implemented at the application processor, wherein the interface module is configured to receive user input.

In another aspect, the authentication request is a Ki authentication request, and the authentication response is a Ki authentication response.

In another aspect, the simulated SIM driver is configured to be loaded with a local SIM profile.

In another aspect, the SIM simulator is further configured to relay the authentication request to a remote server and receive the authentication response from the remote server.

In another aspect, the system further comprises a second simulated SIM driver, wherein the authentication request is relayed to the remote server and the authentication response is received from the remote server via a data communication link established by the second simulated SIM driver.

In another aspect, the system further comprises a second physical SIM driver configured to be coupled to a second physical SIM card; and a second control switch that selectively couples the SIM application to the second physical SIM driver or the second simulated SIM driver, wherein the SIM application, when coupled to the second physical SIM driver, is configured to read and write on the second physical SIM card.

In another aspect, a method comprises loading profile information for a first simulated SIM; receiving a first authentication request for the first simulated SIM; responding to the first authentication request by locally resolving the first authentication request; establishing a data communication link via the first simulated SIM; loading profile information for a second simulated SIM; receiving a second authentication request for the second simulated SIM; relaying the second authentication request to a remote server via the established data communication link; receiving an authentication response to the second authentication request from the remote server via the established data communication link; and responding to the second authentication request with the received authentication response.

In another aspect, the method further comprises switching from a second physical SIM card to the second simulated SIM prior to loading profile information for the second simulated SIM.

In another aspect, the method further comprises switching from a first physical SIM card to the first simulated SIM prior to loading profile information for the first simulated SIM, wherein the first physical SIM card and the second physical SIM card are associated with a same MODEM.

In another aspect, the method further comprises establishing a data communication link via the first simulated SIM again before relaying the second authentication request to the remote server via the established data communication link.

In another aspect, the method further comprises switching from the first simulated SIM back to the first physical SIM card after responding to the second authentication request with the received authentication response.

In another aspect, the method further comprises receiving a third authentication request for the second simulated SIM; establishing a data communication link via the first simulated SIM; relaying the third authentication request to a remote server via the established data communication link; receiving an authentication response to the third authentication request from the remote server via the established data communication link; and responding to the third authentication request with the received authentication response.

In another aspect, the method further comprises restarting the third authentication request by transmitting a time-out indication prior to relaying the third authentication request to the remote server via the established data communication link.

In another aspect, the first and second authentication requests are Ki authentication requests.

In another aspect, the profile information for the first simulated SIM is associated with a foreign SIM profile, and the profile information for the second simulated SIM is associated with a local SIM profile.

In another aspect, a wireless communications device comprises one or more processors configured to load profile information for a first simulated SIM; receive a first authentication request for the first simulated SIM; respond to the first authentication request by locally resolving the first authentication request; establish a data communication link via the first simulated SIM; load profile information for a second simulated SIM; receive a second authentication request for the second simulated SIM; relay the second authentication request to a remote server via the established data communication link; receive an authentication response to the second authentication request from the remote server via the established data communication link; and respond to the second authentication request with the received authentication response.

BRIEF DESCRIPTION OF THE FIGURES

The features of the various aspects are set forth with particularity in the appended claims. The various aspects, both as to organization and methods of operation, together with advantages thereof, may, however best be understood by reference to the following description, taken in conjunction with the accompanying drawings as follows:

DETAILED DESCRIPTION

The following description of certain examples of the technology should not be used to limit its scope. Other examples, features, aspects, aspects, and advantages of the technology will become apparent to those skilled in the art from the following description, which is, by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, examples, etc. described herein may be combined with any one or more of the other teachings, expressions, aspects, examples, etc. that are described herein. The following described teachings, expressions, aspects, examples, etc. should, therefore, not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 1:
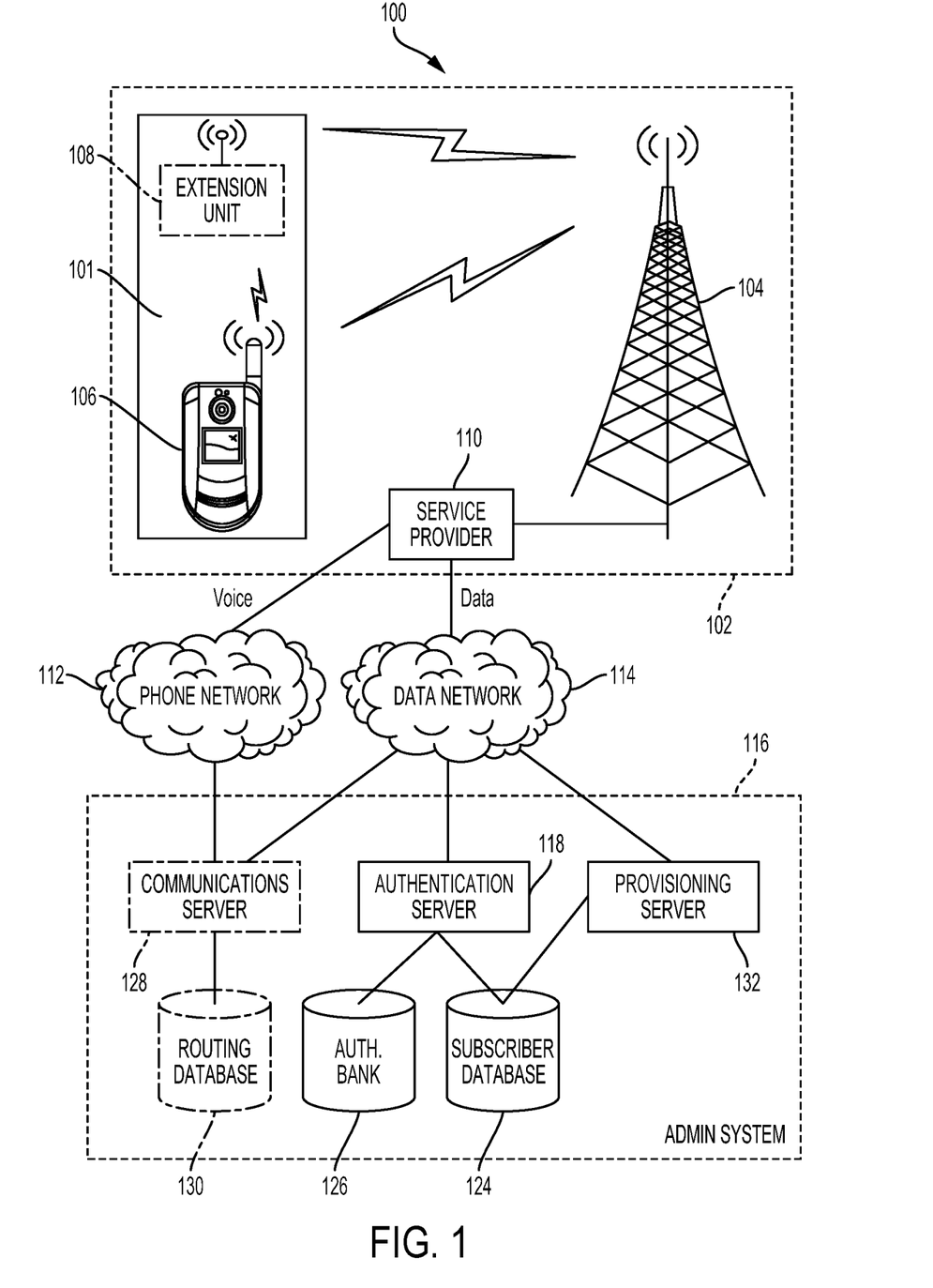
FIG. 1 is a block diagram of one aspect of a system for operating a foreign wireless telecommunications device in a local communication network as if it were a local wireless telecommunications device, according to one aspect of the present disclosure.

FIG. 1 shows a communications system 100 that includes a wireless communication network 102 coupled to a voice network 112, such as a public switched telephone network (PSTN), and a data network 114. The communications system 100 also includes an administration system 116 coupled to the voice network 112 and data network 114. The wireless communications network 102 may be used to communicate voice and/or data and includes cellular telephone, WIFI, or WIMAX networks. In the case of a cellular telephone network, the network 102 includes a number of cellular sites or base stations 104, which typically consist of an antenna tower, transceiver radios (i.e., base transceiver station), and radio controllers (i.e., base station controller). In the case of data networks, such as WIFI or WIMAX, the network 102 includes a number of base stations 104, which typically include access points, wireless routers, or the like. Base stations 104 include a transceiver, or a transmitter and receiver, through which radio links are established between the network 102 and a number of wireless communication clients, including the wireless communication client 106.

The wireless communication client 106 may be any telephone or computing device capable of communicating wirelessly, such as a cellular telephone handset, personal digital assistant (PDA), computer, VOIP gateway, SIP phone, or the like. In some embodiments, the wireless communication client 106 must be capable of accessing and communicating data.

Also shown in FIG. 1 is an optional wireless communication extension unit 108. In these embodiments, the extension unit 108 is capable of communicating with both the wireless communication client 106 and the wireless communication network 102, including base station 104. Also, as used herein the combination of the wireless communication client 106 and/or the extension unit 108 is referred to as the wireless communication system 101.

The provider 110 of the wireless network 102 is coupled to the one or more base stations 104. This service provider 110 is also coupled to the voice network 112 and the data network 114.

For convenience, the remainder of the description of FIG. 1 will refer to the embodiment where the wireless network 102 is a cellular telephone network, such as a GSM, GPRS (General Packet Radio Service), CDMA (Code Division Multiple Access), EDGE Enhanced Data for GSM Evolution, 3GSM, DECT, IS-136, and iDEN, analog, and any combination of these, and the like. However, it should be appreciated that the same system can be used for providing any other type of wireless voice or data service, such as WIMAX, WiFI, VOIP, etc.

The service provider 110 may include a number of mobile telephone switching centers ("MSC"), located at one or more mobile telephone switching offices ("MTSO") which route the transmissions. Additionally, the service provider 110 may include one or more base cellular centers ("BSC"), not shown, coupled between base stations 104 and the MSCs 20, for example, to handle call hand off.

The service provider 110 constantly monitors the signal strength of both the caller and receiver, locating the next cell site when signal strength fades, and automatically rerouting the communications to maintain the communications link. For example, when the wireless communication client 106 moves from one cell to another cell, the service provider 110 monitors the movement, and transfers or hands-off the telephone call from a first base station to a new base station at the appropriate time. The transfer may include switching the radio frequency of the communication, and is transparent to the user. Thus, the service provider 110 acts like a standard PSTN or ISDN switching node, and additionally provides mobile subscriber related functions such as registration, authentication, location updating, handovers and call routing to roaming subscribers.

The service provider 110 typically employs one or more databases (e.g., Home Location Register "HLR" and a Visitor Location Register "VLR") for tracking subscribers, routing calls and roaming. The service provider 110 also typically employs a database (e.g., Authentication Center "AuC") for authenticating subscribers, and a separate database (e.g., Equipment Identity Register "EIR") for verifying the equipment. The service provider 110 allocates a routing number to each of the calls that the service provider 110 is switching. While the routing number is different than the unique subscriber identifier (e.g., IMSI) and the unique equipment identifier (e.g., International Mobile Equipment Identity "IMEI"), the MTSO may define a relationship between the routing number and the subscriber and/or equipment identifiers associated with each wireless communication client 106. These identifiers allow the service provider 110 to track and coordinate all wireless communication clients 106 in its service area, and also allow the service provider 110 to determine the validity of the call and caller.

As is well understood and documented in the art, the service provider 110 routes voice communications to other callers on its network, through its network of base stations 104, or to the PSTN network 112. Data communications are routed to the data network 114, which is typically the Internet.

The data network 114 is coupled to the administration system 116. The administration system 116 provisions the foreign wireless communication client 106 to operate in a local wireless communication network 102 as if it were a local wireless communication client. By "foreign" it is meant that the wireless communication client 106 (or its SIM card) is not subscribed to the wireless communications network 102. For example, a cellular telephone associated with a wireless contract with AT&T® in San Francisco (the foreign wireless communication client) is not subscribed to the VODAPHONE® cellular telephone network in London (the local wireless communication network). Here, the administration system 116 enables the AT&T® cellular telephone to operate in London as if it were a cellular telephone associated with a contract with VODAPHONE® in London.

The administration system 116 includes at least one authentication server 118 coupled to a subscriber database 124 and an authentication bank 126, as well as at least one optional communications server 128 coupled to a routing database 130. The authentication server 118 primarily authenticates incoming requests for authentication and maintains subscriber accounts. The communications server 128 facilitates the rerouting of non-local calls to further provide reduced cost routing. The administration system 116 includes at least one provisioning server 132, which provides requesting subscribers with remote authentication software. The provisioning server 132 and/or authentication server 118 and/or communications server 128 may be implemented as one or more components local to regional networks, at a central location, at enterprise computing/communications centers, or in consumer products.

The one or more authentication banks 126 and/or the one or more subscriber databases 124 may be commonly housed or housed separately from the one or more associated authentication servers 118, communication servers 128, and routing databases 130. Some embodiments of the administration system 116 may include additional components for redundancy and faster access time.

Figure 2:
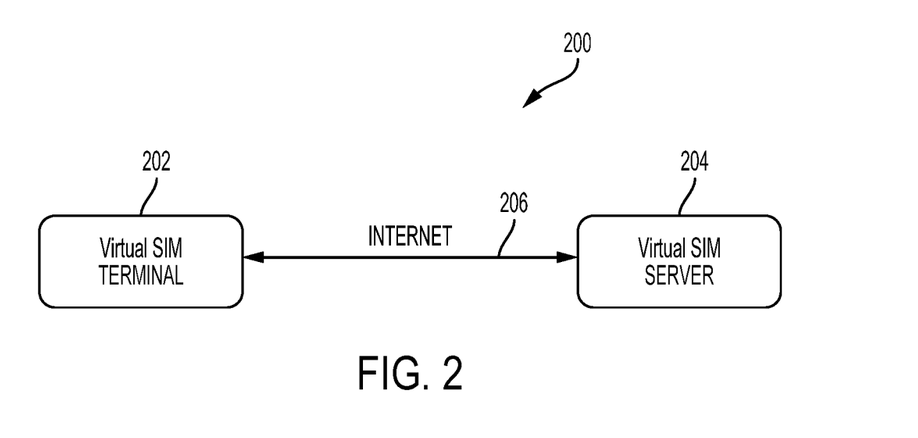
FIG. 2 is a diagram illustrating a system implementing virtual SIM technology according to one aspect of the present disclosure.

FIG. 2 is a diagram 200 illustrating a system implementing virtual SIM technology according to one aspect of the present disclosure. A Virtual SIM Terminal 202 is in communication with a Virtual SIM Server 204 over the Internet 206, for example. For convenience, the term Virtual SIM Terminal 202 may be used to mean a mobile device capable of cellular communication without physical SIM Cards. The terms VirtualSIM or VSIM may be used to mean software that runs in internal memory on a mobile device, which implements the logics and functions of the software running on a physical SIM Card except for the authentication (e.g., Ki authentication) logics. The term SoftSIM may be used to mean software that runs in internal memory on a mobile device, which implements the logics and functions of the software running on a physical SIM Card including the authentication (e.g., Ki authentication) logics. The term simulated SIM may be used to mean either VirtualSIM or SoftSIM, or a combination thereof. The term or acronym HWSIM may be used to mean physical SIM Card. Finally, the term Virtual SIM Server 204 may be used to mean a server that provides SIM profiles and authentication functions for the VirtualSIM. The Virtual SIM Terminal 202 may be, for example, the wireless communication client 106 or the extension unit 108 described with reference to FIG. 1, or a combination thereof. The Virtual SIM Server 204, for example, may be one or more of the authentication server 118, the provisioning server 132, and the communications server 128 described with reference to FIG. 1. The Virtual SIM Server 204 may provide SIM profiles at least in part by accessing the subscriber database 124 described with reference to FIG. 1, and may provide authentication functions at least in part by accessing the authentication bank 126 described with reference to FIG. 1.

In a Virtual SIM Terminal 202 configuration, the mobile device may communicate with VirtualSIM and SoftSIM modules without accessing a physical SIM Card. VirtualSIM and SoftSIM may process the requests and send responses back to the mobile device. In other words, VirtualSIM and SoftSIM may perform the functions of a physical SIM Card.

Before a user turns on the Virtual SIM Terminal 202, the SoftSIM profile may be provisioned on the mobile device. At the time of bootstrapping, SoftSIM may establish a data connection between the Virtual SIM Terminal 202 and the Virtual SIM Server 204 (sometimes referred to as the back-end server, or the remote server) via the Internet, and download the basic VirtualSIM profile data excluding authentication information (e.g., Ki authentication information). The VirtualSIM profile may be selected based on quality and cost of services among carriers.

The Virtual SIM Terminal 202 may use the VirtualSIM profile to provide the service to end-users after it is provisioned. When the network challenges the terminal for authentication (e.g., Ki authentication), the VirtualSIM may send the authentication request to the Virtual SIM Server through the data connection previous established by the SoftSIM. The Virtual SIM Server may route the request to the physical cards connected to it and send the authentication response back to the Virtual SIM Terminal 202.

In some embodiments, the SoftSIM profile may be associated with a foreign SIM profile which is subject to roaming charges, and the VirtualSIM profile may be associated with a local SIM profile which is not subject to roaming charges. By using the SoftSIM mainly for authentication purposes and using the VirtualSIM for other communications, service charges may be reduced.

Figure 3A:
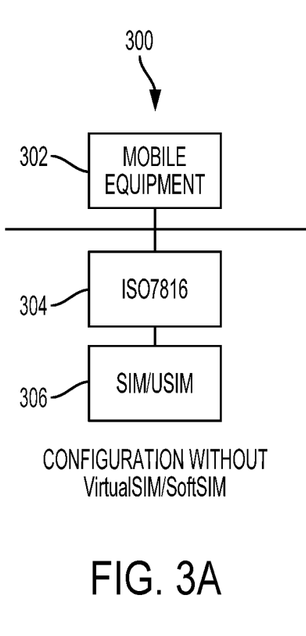
FIG. 3A is a diagram illustrating a configuration without VirtualSIM/SoftSIM.
Figure 3B:
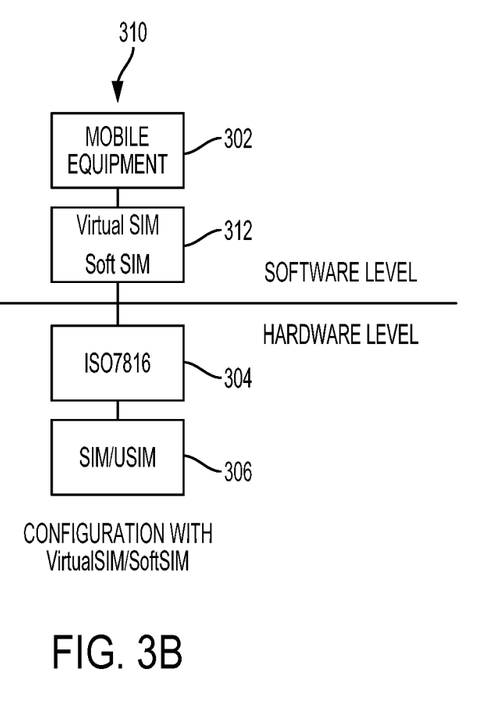
FIG. 3B is a diagram illustrating a configuration with VirtualSIM/SoftSIM, according to one aspect of the present disclosure.

FIG. 3A is a diagram 300 illustrating a configuration without VirtualSIM/SoftSIM and FIG. 3B is a diagram 310 illustrating a configuration with VirtualSIM/SoftSIM, according to one aspect of the present disclosure. In the configuration without VirtualSIM/SoftSIM as shown in diagram 300 of FIG. 3A, the software on the mobile device or Mobile Equipment 302 ("ME") accesses a physical SIM card or USIM card 306 via an ISO7816 hardware interface 304. In the configuration with VirtualSIM/SoftSIM as shown in diagram 310 of FIG. 3B, the architecture supports both the physical SIM/USIM Card 306 and VirtualSIM/SoftSIM 312. In normal mode, the VirtualSIM/SoftSIM module 312 is transparent and all commands between the software and the ISO7816 hardware interface 304 will pass through. When the VirtualSIM/SoftSIM 312 logic is activated, it may intercept the control data and act as a physical SIM/USIM Card 306.

Figure 4:
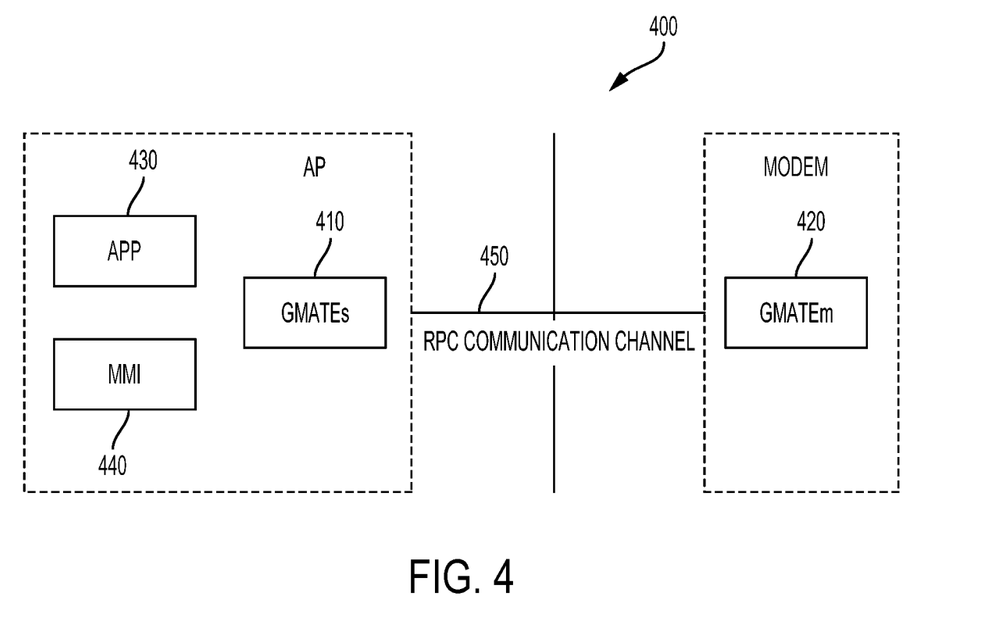
FIG. 4 is a diagram illustrating a VirtualSIM module according to one aspect of the present disclosure.

FIG. 4 is a diagram illustrating a VirtualSIM module 400 according to one aspect of the present disclosure. The VirtualSIM module 400 may comprise two components 410, 420, which may be denoted by GMATEs 410 and GMATEm 420, respectively. The GMATEs 410 and the GMATEm 420 components may be processes running on a mobile device, for example. In one embodiment, the GMATEs 410 may be implemented on an application processor ("AP"), and the GMATEm 420 may be implemented on a MODEM. The GMATEs 410 and the GMATEm 420 may communicate via a Remote Procedure Call ("RPC") communication channel 450. Once the GMATEm 420 starts, the MODEM treats the GMATEm 420 as a SIM Card. If there are multiple MODEMs, there may be one GMATEm 420 for each MODEM, and each GMATEm 420 may connect to the GMATEs 410 via RPC.

The VirtualSIM module 400 may further comprise an application ("APP") 430 for controlling the functionality of the SIM simulator 620 and a man-machine interface ("MMI") 440 for receiving user input. User interaction is implemented on the APP 430 or the MMI 440. In Android systems, MMI 440 is implemented in APP 430. Other systems might implement the MMI 440 on the interface layer. Since it is more convenient to modify and update the functionality of the VirtualSIM module 400 on APP 430 or MMI 440, most of the functions of the VirtualSIM module 400 may be implemented in the GMATEs 410.

Figure 5:
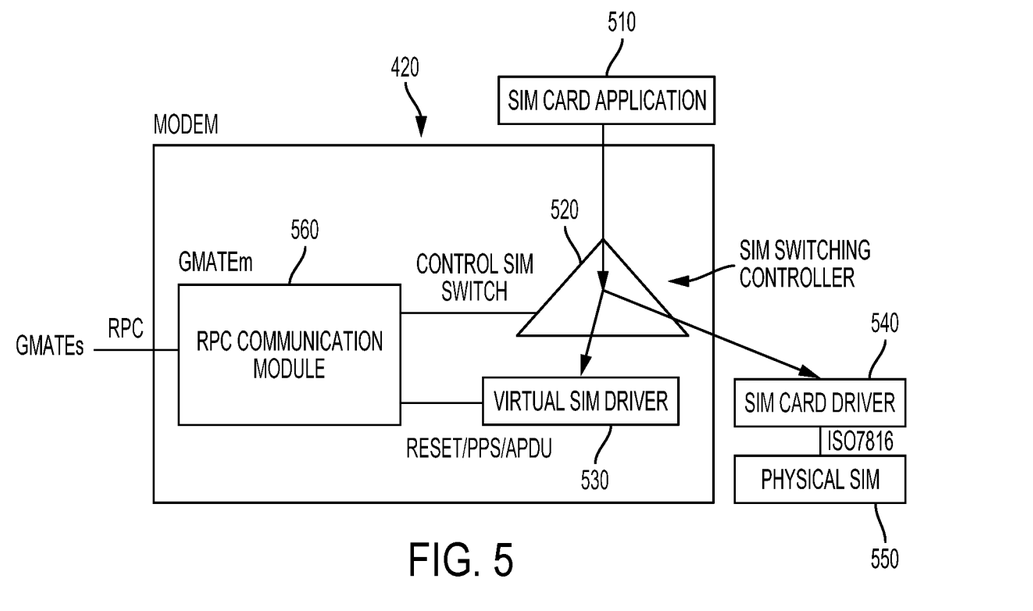
FIG. 5 is a diagram illustrating a GMATEm component according to one aspect of the present disclosure.

FIG. 5 is a diagram illustrating a GMATEm component 420 according to one aspect of the present disclosure. As discussed above, the GMATEm 420 may be a process running on a MODEM. The GMATEm 420 may comprise an RPC communication module 560, a VirtualSIM driver 530, and a SIM switching controller 520. The RPC communication module 560 may be in communication with GMATEs 410 via RPC, and may be in communication with the SIM switching controller 520 and the VirtualSIM driver 530.

Traditionally, a SIM application module 510 communicates with a physical SIM card 550 through a SIM card driver 540. The physical SIM card driver 540 receives commands from the SIM application 510 and communicates with the physical SIM Card 550 through an ISO7816 interface. The MODEM reads and writes on the physical SIM card 550 through the SIM application 510 and the SIM card driver 540.

As shown in FIG. 5, the SIM switching controller 520 may intercept the communication between the SIM application module 510 and the SIM card driver 540. The RPC communication module 560 may send a SIM switching command to the SIM switching controller 520. In response to the command, the SIM switching controller 520 may selectively couple the SIM application 510 to the VirtualSIM driver 530 or the physical SIM card driver 540. Therefore, the SIM switching controller 520 may route data from the SIM application 510 to either the VirtualSIM driver 530 or the physical SIM card driver 540.

The VirtualSIM driver 530 may run on the MODEM. The VirtualSIM driver 530 may be an adapter that implements the same interface as the physical SIM card driver 540 when it communicates with the SIM card application 510. The VirtualSIM driver 530 may send RESET, PPS (Protocol and Parameter Selection), APDU (Application Protocol Data Unit), and other control data received from the SIM application module 510 to the RPC communication module 560, which may relay the control data to GMATEs 410. The VirtualSIM driver 530 may also notify the SIM application 510 that the SIM card has been changed and request the SIM application 510 to reset and read the new SIM card information.

Figure 6:
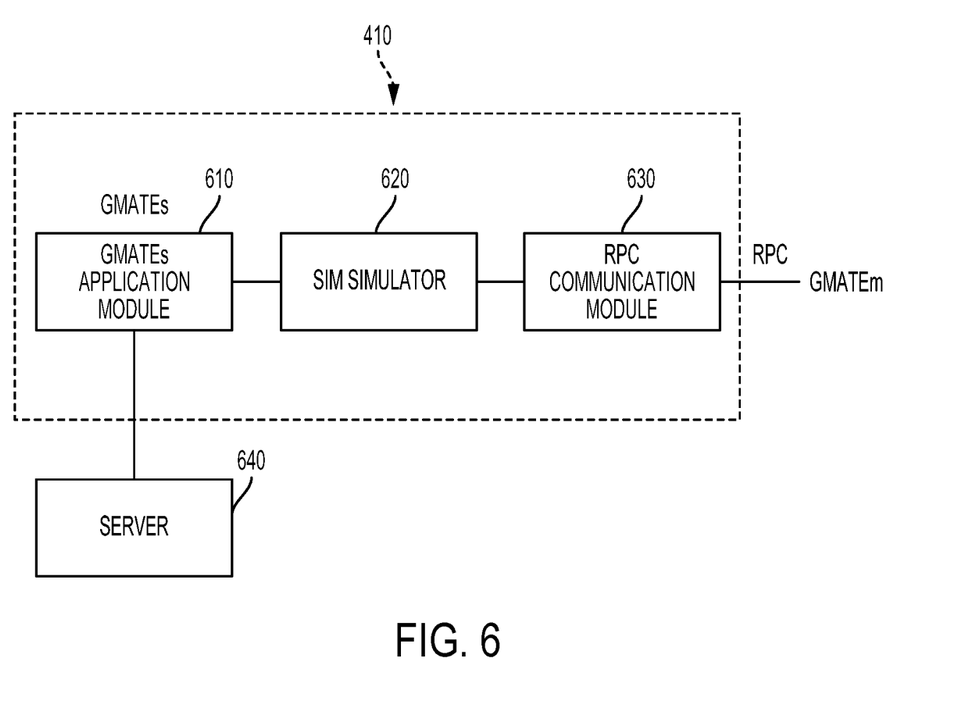
FIG. 6 is a diagram illustrating a GMATEs component according to one aspect of the present disclosure.

FIG. 6 is a diagram illustrating a GMATEs component 410 according to one aspect of the present disclosure. As discussed above, the GMATEs 410 may be a process running on an AP. The GMATEs 410 may need to have root access to connect to the MODEM via RPC. The GMATEs 410 may comprise a GMATEs application module 610, a SIM simulator 620, and a RPC communication module 630.

The RPC communication module 610 may send/receive control data to/from the GMATEm 420 implemented on the MODEM. The RPC communication module 610 may need to send or receive at least 1024 bytes of data, respond with a confirmation, and wait until it receives the responses from the MODEM.

The SIM card simulator 620 may be in communication with the GMATEm 420 via the RPC communication module 630. The SIM card simulator 620 may function as a SIM card operating system. The SIM card simulator 620 may control the selective coupling of the SIM switch controller 520, and may receive requests from the SIM card application module 510 on the MODEM and respond with SIM card profile information such as ICCID (Integrated Circuit Card ID), IMSI (International Mobile Subscriber Identity) received from a back-end server 640. A default SIM profile may be used if the SIM card simulator 620 does not receive a new profile from the back-end server 640.

The GMATEs application module 610 may receive SIM profiles from the back-end server 640 and send it to the SIM card simulator 620. It may also monitor the GMATEs process. If there is an error, the GMATEs application module 610 may request the GMATEm 420 to reset the SIM card. When the network challenges the device for VirtualSIM authentication, the GMATEs application module 610 may relay a SIM authentication request and a SIM authentication response between the MODEM and the back-end server 640.

Figure 7:
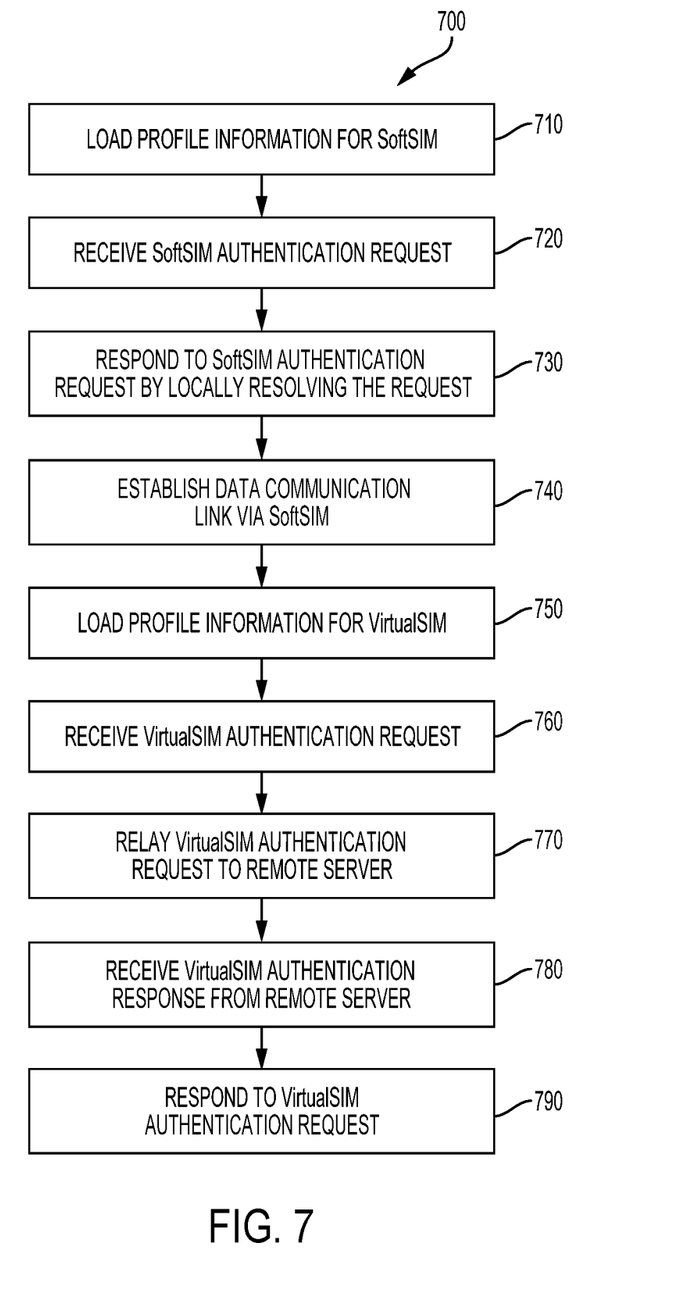
FIG. 7 is a flow diagram illustrating a workflow according to one aspect of the present disclosure.

FIG. 7 is a flow diagram 700 illustrating a workflow according to one aspect of the present disclosure. In the example illustrated in FIG. 7, two MODEMs may be implemented, one being used with the SoftSIM and the other being used with the VirtualSIM. Similar to the VirtualSIM, the SoftSIM may comprise a GMATEs and a GMATEm. In some embodiments, the SoftSIM may share a common GMATEs with the VirtualSIM, but comprise a separate GMATEm. In order to allow VirtualSIM to communicate to the back-end server, the SoftSIM process may start and establish a data connection to the back-end server ahead of time.

Initially, profile information for the SoftSIM is loaded 710. The SoftSIM profile including Ki and OP (Operator) may be pre-downloaded or burned onto the device. Thereafter the SoftSIM process may be started in a way substantially similar to the VirtualSIM start process 1-4 described below.

With reference now to FIGS. 4-7, a SoftSIM authentication request is received 720. For example, a service provider may challenge the device with an authentication request (e.g., Ki authentication request) before wireless communication service can be provided to the SoftSIM. The authentication request may be part of an APDU request. Since the SIM simulator 620 can resolve the SoftSIM authentication request on the device, it does not need to relay the authentication request to the back-end server 640. Therefore, the SoftSIM authentication request is responded 730 to by locally resolving the request. A data communication link is established 740 via the SoftSIM.

With reference now to FIGS. 4-7, the profile information for VirtualSIM is loaded 750. For example, the GMATEs 410 may request a VirtualSIM profile from the back-end server 640. The VirtualSIM profile may comprise ICCID, IMSI, PLMN (Public Land Mobile Network), and other parameters, but not Ki. The VirtualSIM profile is stored on device. The GMATEs application module 610 sends the VirtualSIM profile to the SIM simulator 620 and starts the SIM card simulator 620.

With reference now to FIGS. 4-7, thereafter the VirtualSIM process may be started as follows:

1. The SIM simulator 620 sends a reset request to the GMATEm 420 on the MODEM through the RPC communication module 630.

2. The RPC communication module 560 on the GMATEm 420 receives the reset request. In response, the SIM switching controller 520 connects the SIM application module 510 and the VirtualSIM driver 530 (e.g., switching from the physical SIM card 550), and the VirtualSIM driver 530 sends out on and off status change. This will trigger the SIM card application 510 to send out a RESET command to the VirtualSIM driver 530, which sends the command to the SIM simulator 620.

3. Once the SIM simulator 620 receives the RESET command from the VirtualSIM driver 530, the SIM simulator 620 responses with ATR (Answer to Reset). If the SIM simulator 620 does not receive the RESET command from the Virtual SIM driver 530 within a certain period, the SIM simulator 620 will resend the reset request. If failure occurs repeatedly, e.g., for three times, the SIM simulator 620 will request the entire MODEM to reset.

4. Once the SIM simulator 620 receives the RESET command and sends out ATR, the GMATEs 410 continues receiving data from and responding to the GMATEm 420 on the MODEM.

Thereafter, a VirtualSIM authentication request is received 760. For example, a service provider may challenge the device with an authentication request (e.g., Ki authentication request) before wireless communication service can be provided to the VirtualSIM. The authentication request may be part of an APDU request. The SIM simulator 620 may resolve and respond to the APDU request on the device except for authentication request.

The VirtualSIM authentication request is relayed 770 to a remote server, e.g., the back-end server 640, via the data communication link established by the SoftSIM. For example, when the SIM simulator 620 receives the VirtualSIM authentication request, it requests the VirtualSIM driver 530 to hold the command execution and wait for the authentication response. At the same time, the SIM simulator 620 sends the authentication request to the back-end server 640, which resolves the authentication request.

A VirtualSIM authentication response is received 780 from the remote server via the data communication link. The VirtualSIM authentication request is responded 790 to with the authentication response received from the remote server. For example, once the SIM simulator 620 receives the authentication response from the back-end server 640, it sends the response to the SIM card application 510 on the MODEM. Therefore, wireless communication service is provided to the VirtualSIM. If the SIM simulator 620 receives the next authentication request, the process 760-790 will be repeated.

If the GMATEs application 610 does not receive 780 the authentication response from the back-end server 640 for a period of time, e.g., 10 s, the GMATEs application 610 will inform the SIM simulator 620 that the authentication has failed, e.g., by sending a time-out indication. The SIM simulator 620 will then inform the VirtualSIM driver 530 that the authentication has failed. The VirtualSIM will be reset again, and the process 760-790 will be repeated.

Figure 8:
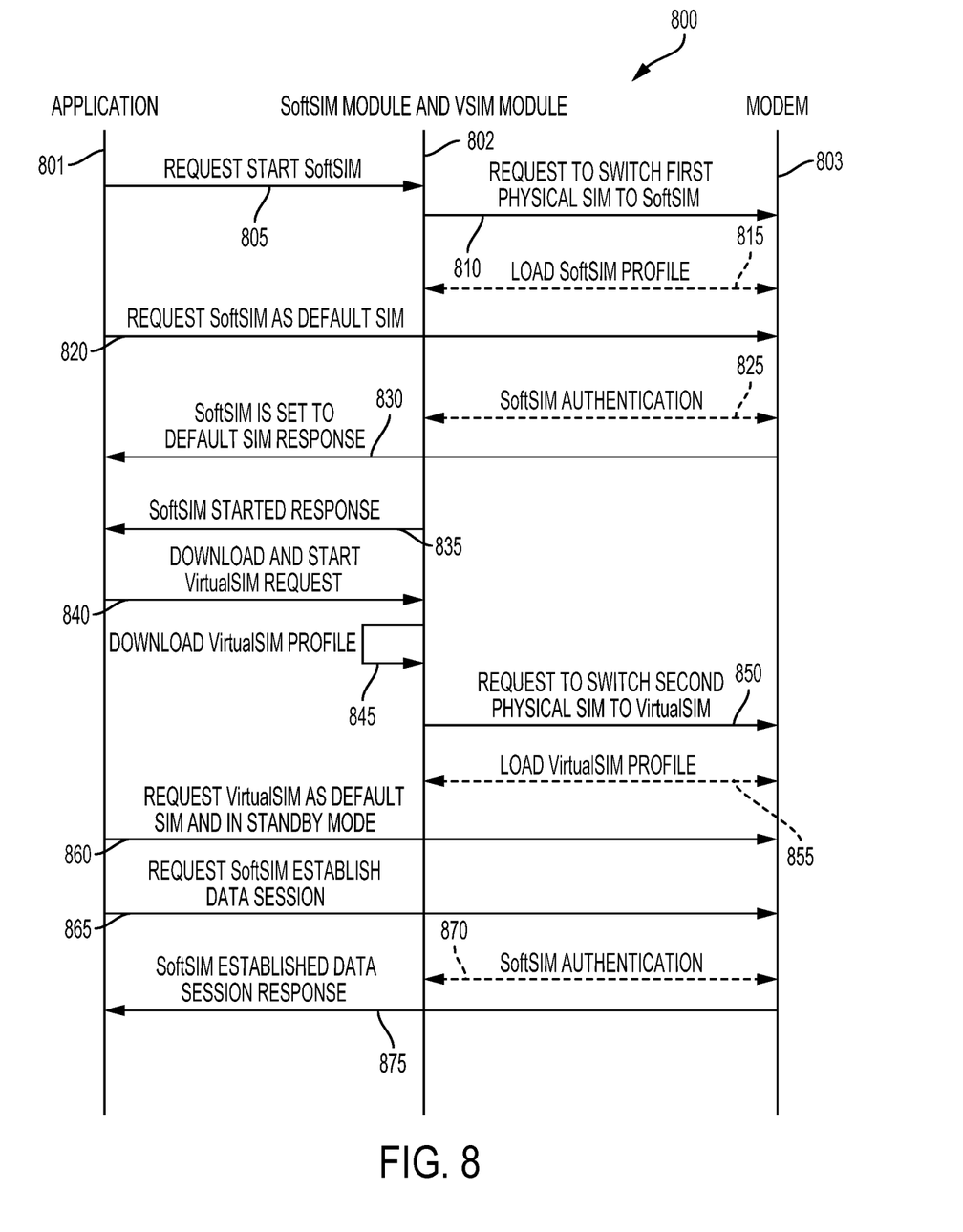
FIG. 8 is a diagram illustrating a workflow when a DSDS configuration is implemented, according to one aspect of the present disclosure.
Figure 9:
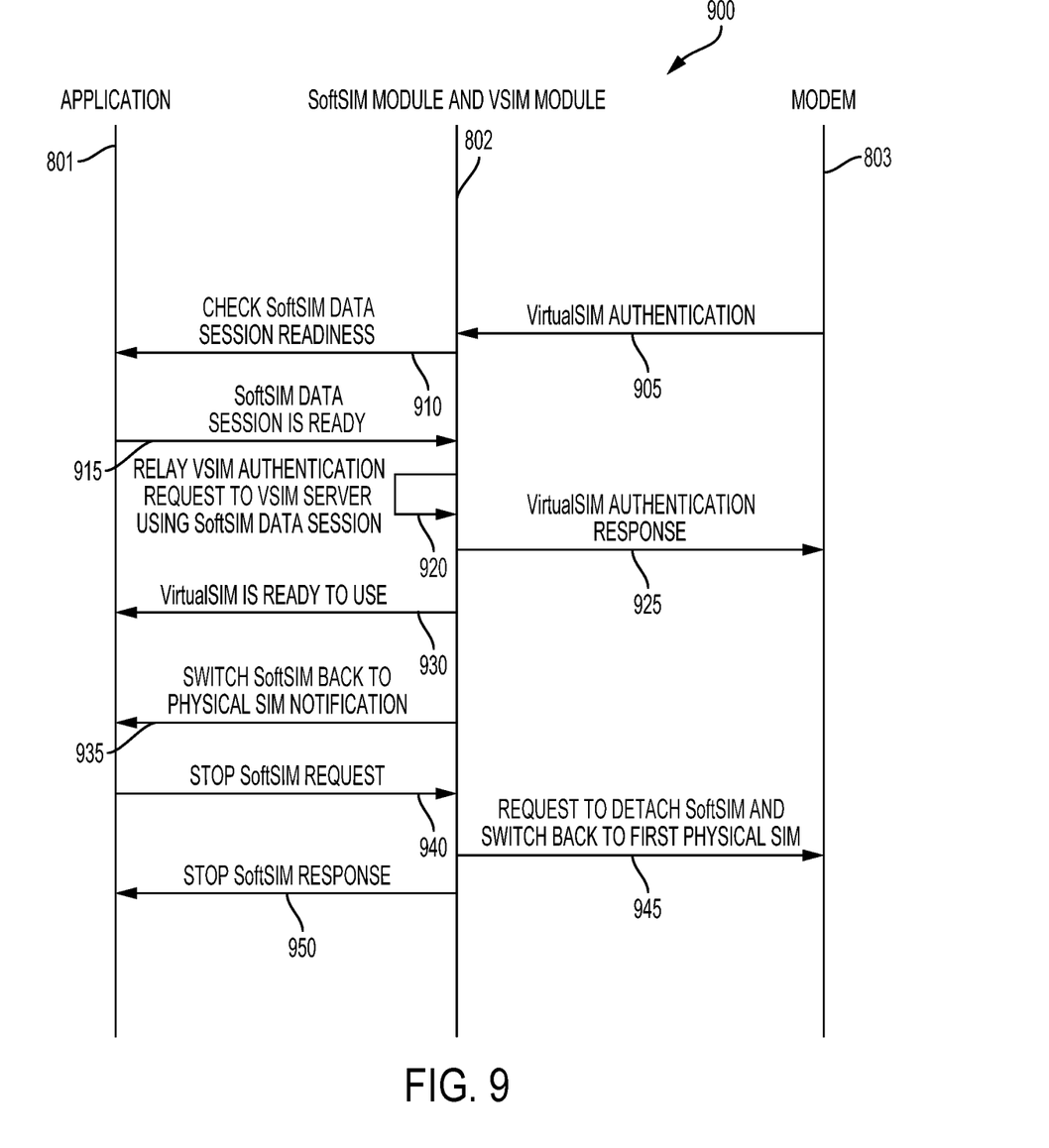
FIG. 9 is a diagram illustrating a workflow when a DSDS configuration is implemented, according to one aspect of the present disclosure.
Figure 10:
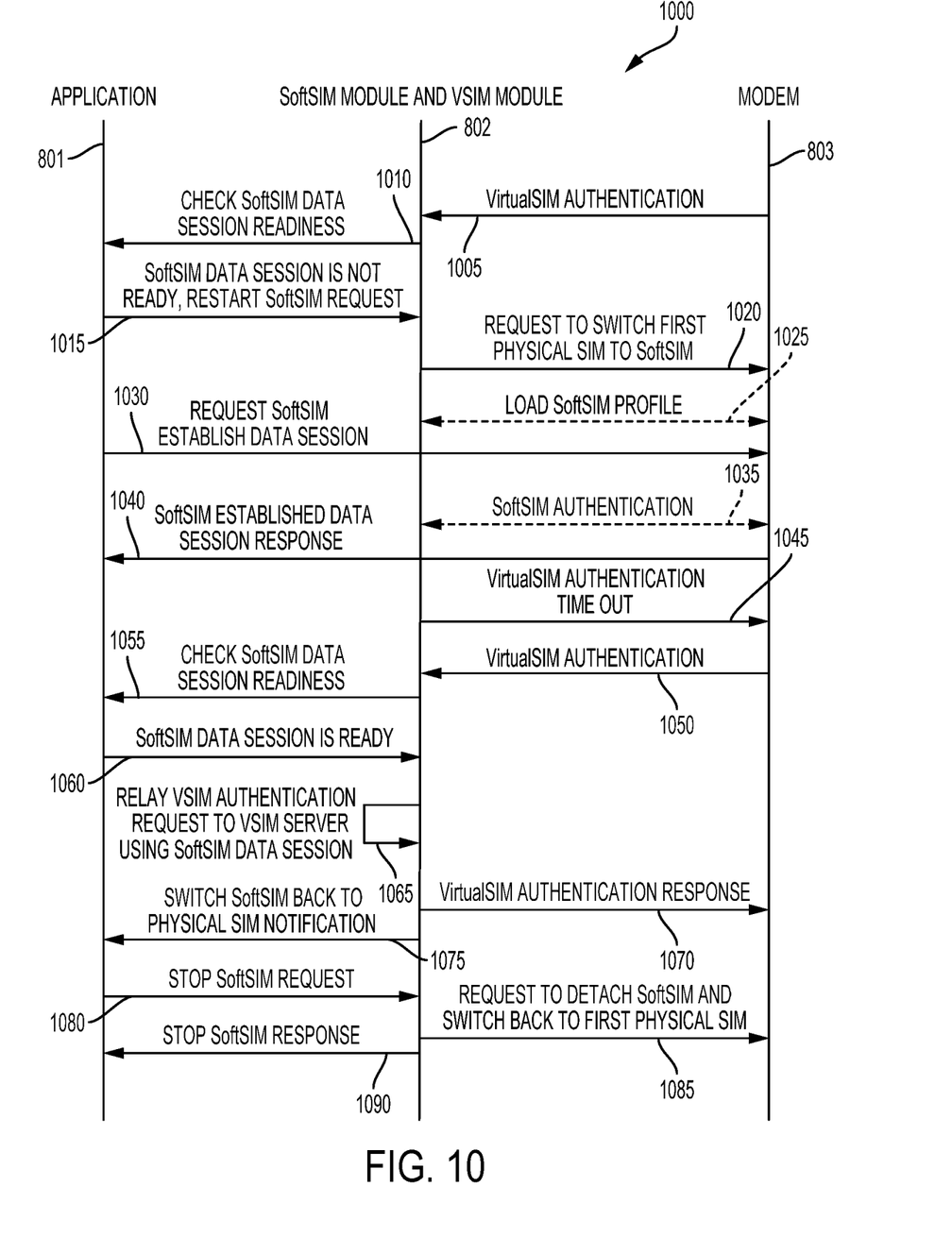
FIG. 10 is a diagram illustrating a workflow for re-authentication when a DSDS configuration is implemented, according to one aspect of the present disclosure.
Figure 11:
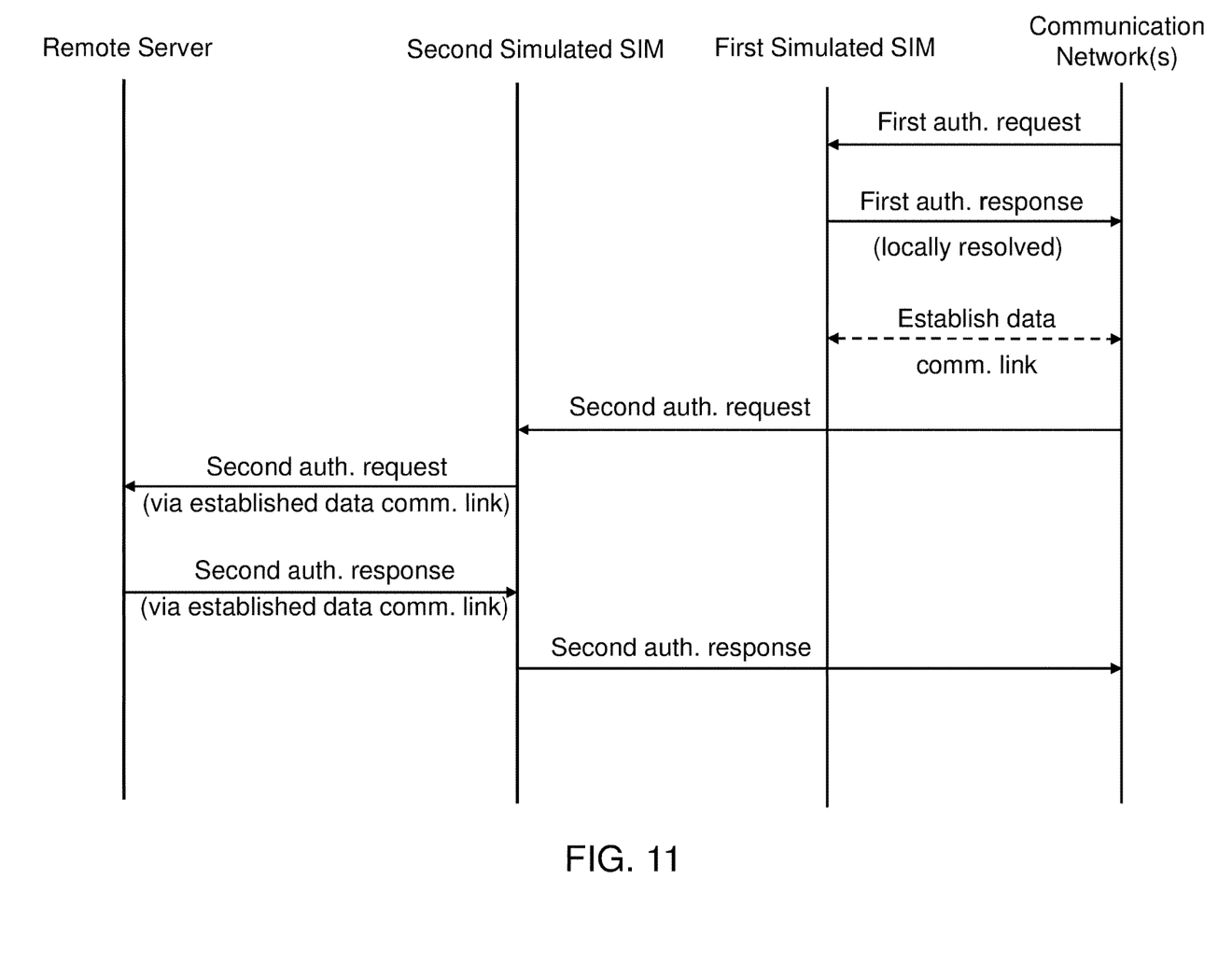
FIG. 11 is a diagram illustrating a workflow for authentication according to one aspect of the present disclosure.

With reference now to FIGS. 8-10, embodiments of the present disclosure implementing a Dual-SIM-Dual-Standby (DSDS) configuration are described below. A typical DSDS device implements two SIM cards on a single MODEM. Therefore, such a DSDS device may not be able to have both SIM cards connected to the network at the same time. In other words, when one SIM card is working, the other is in standby mode. For example, a DSDS device may comprise another physical SIM driver, another SIM switching controller, and a SoftSIM driver similar to the physical SIM driver 504, the SIM switching controller 520 and the VirtualSIM driver 530 in FIG. 5.

FIGS. 8 and 9 are diagrams 800, 900 illustrating workflows when a DSDS configuration is implemented, according to various aspects of the present disclosure. In FIGS. 8-10, arrows represent communications among the application 801, the SoftSIM/VirtualSIM module 802, and the MODEM 803. The application 801 may be an operation system level application on a mobile device. The SoftSIM/Virtual SIM module 802 may represent the GMATEs 410 described with reference to FIG. 4, and the MODEM 803 may represent the GMATEm 420 described with reference to FIG. 4. In FIGS. 8-10, each dashed line represents one or more communications between the components, which may be in either direction.

According to embodiments of the present disclosure, the SoftSIM module may connect to the Internet and simulate the first physical SIM on the DSDS device. The SoftSIM module may connect to the Virtual SIM Server to load a VirtualSIM profile. Once the SoftSIM module receives the VirtualSIM profile from the Virtual SIM Server, the SoftSIM may be set as the default SIM to open a data session.

When the VirtualSIM receives an authentication challenge from the network, the MODEM may send the authentication request to the VirtualSIM Module. It is then determined if the SoftSIM is ready to transmit data. If the SoftSIM has data session opened and is ready to transmit data, the authentication request may be relayed to the Virtual SIM Server. Otherwise the SoftSIM module may start the SoftSIM and open the data session again as described above. Once an authentication response is received from the Virtual SIM Server, the response may be relayed to the network through the MODEM. Now the VirtualSIM is ready to use. Optionally, the SoftSIM module may terminate the SoftSIM and switch back to the first physical SIM for standby mode. Therefore, the first physical SIM may still be used to receive phone calls, SMS, etc.

Specifically, at 805, the application 801 sends a request to start the SoftSIM to the SoftSIM/VirtualSIM module 802. At 810, the SoftSIM/VirtualSIM module 802 sends a request to switch the first physical SIM to the SoftSIM to the MODEM 803. At 815, the SoftSIM profile is loaded. At 820, the application 801 sends a request to set the SoftSIM as the default SIM to the MODEM 803. At 825, the SoftSIM authentication is completed. At 830, the MODEM 803 sends a response to the application 801 indicating that the SoftSIM has been set as the default SIM. At 835, the SoftSIM/VirtualSIM module 802 sends a response to the application 801 indicating the SoftSIM has started. At 840, the application 801 sends a request to download and start the VirtualSIM to the SoftSIM/VirtualSIM module 802. At 845, the VirtualSIM profile is downloaded by the SoftSIM/VirtualSIM module 802. At 850, the SoftSIM/VirtualSIM module 802 sends a request to switch the second physical SIM to the VirtualSIM to the MODEM 803. At 855, the VirtualSIM profile is loaded. At 860, the application 801 sends a request to set the VirtualSIM as the default SIM and in standby mode to the MODEM 803. At 865, the application 801 sends a request to establish the SoftSIM data session to the MODEM 803. Note that prior to 865, any data session established by SoftSIM may have been time out. At 870, the SoftSIM authentication is completed. At 875, the MODEM 803 sends a response to the application 801 indicating that the SoftSIM data session has been established.

At 905, the MODEM 803 sends a VirtualSIM authentication request to the SoftSIM/VirtualSIM module 802. At 910, the SoftSIM/VirtualSIM module 802 sends a request to check if the SoftSIM data session is ready to the application 801. If the SoftSIM data session is ready, at 915, the application 801 sends a response to the SoftSIM/VirtualSIM module 802 indicating that the SoftSIM data session is ready. At 920, the SoftSIM/VirtualSIM module 802 relays the VirtualSIM authentication request to the Virtual SIM Server using the SoftSIM data session, and receives an authentication response from the Virtual SIM Server using the SoftSIM data session. At 925, the SoftSIM/VirtualSIM module 802 sends the VirtualSIM authentication response to the MODEM 803. At 930, the SoftSIM/VirtualSIM module 802 sends a response to the application 801 indicating the VirtualSIM is ready to use. At 935, the SoftSIM/VirtualSIM module 802 sends a notification to switch the SoftSIM back to the physical SIM to the application 801. At 940, the application 801 sends a request to the SoftSIM/VirtualSIM module 802 to stop the SoftSIM. At 945, the SoftSIM/VirtualSIM module 802 sends a request to detach the SoftSIM and switch back to the first physical SIM to the MODEM 803. At 950, the SoftSIM/VirtualSIM module 802 sends a response to the application 801 indicating the SoftSIM has been stopped.

FIG. 10 is a diagram 1000 illustrating a workflow for re-authentication when a DSDS configuration is implemented, according to one aspect of the present disclosure. Once in a while, certain conditions may trigger the network to send authentication requests to the MODEM 803 to challenge the VirtualSIM again. Once the SoftSIM/Virtual SIM module 802 receives the network challenge, the SoftSIM/Virtual SIM module 802 may check if the SoftSIM data session is still available. If the SoftSIM data session is still available, the SoftSIM/Virtual SIM module 802 may relay the authentication request back to the VirtualSIM Server. To maintain the VirtualSIM session, the SoftSIM/Virtual SIM module 802 sends an authentication response received from the VirtualSIM Sever to the network through the MODEM 803 in time. If the SoftSIM data session is not available, the SoftSIM/Virtual SIM module 802 may start the data session similar to the process described in FIG. 8. After the SoftSIM/Virtual SIM module 802 responds to the network authentication challenge, the SoftSIM/Virtual SIM module 802 will keep the VirtualSIM session for normal usage. The optional last step is to terminate the SoftSIM connection and switch it back to the first physical SIM to keep the first physical SIM available for receiving phone calls, SMS, etc.

Specifically, at 1005, the MODEM 803 sends a VirtualSIM authentication request to the SoftSIM/Virtual SIM module 802. At 1010, the SoftSIM/VirtualSIM module 802 sends a request to the application 801 to check if the SoftSIM data session is ready. If the SoftSIM data session is not ready, at 1015, the application 801 sends a response to the SoftSIM/VirtualSIM module 802 indicating the SoftSIM data session is not ready, and requests to restart the SoftSIM. At 1020, the SoftSIM/VirtualSIM module 802 sends a request to the MODEM 803 to switch the first physical SIM to SoftSIM. At 1025, the SoftSIM profile is loaded. At 1030, the application 801 sends a request to the MODEM 803 to establish the SoftSIM data session. At 1035, the SoftSIM authentication is completed. At 1040, the MODEM 803 sends a response to the application 801 indicating the SoftSIM data session had been established. At 1045, the SoftSIM/VirtualSIM module 802 sends a VirtualSIM authentication time-out indication to the MODEM 803. Note that at this time the VirtualSIM authentication may not be actually time-out, but a time-out indication may be needed to restart the authentication process. At 1050, the MODEM 803 sends a VirtualSIM authentication request to the SoftSIM/VirtualSIM module 802 again. Because the SoftSIM data session should be available by now, the remaining sequence 1055-1090 will be substantially the same as 910-950 shown in FIG. 9. Therefore, the VirtualSIM may be re-authenticated and SoftSIM may be terminated thereafter.

In summary, numerous benefits have been described that result from employing the concepts described herein. The foregoing description of the one or more aspects has been presented for purposes of illustration and description. It is not intended to be exhaustive or limiting to the precise form disclosed. Modifications or variations are possible in light of the above teachings. The one or more aspects were chosen and described in order to illustrate principles and practical application to thereby enable one of ordinary skill in the art to utilize the various aspects and with various modifications as are suited to the particular use contemplated. It is intended that the claims submitted herewith define the overall scope.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the described embodiments can utilize different registration, power-up, call-out or call-in procedures than those described here. The embodiments were chosen and described in order to best explain the principles of the invention and its practical applications, to thereby enable others skilled in the art to best utilize the invention and various embodiments with various modifications as are suited to the particular use contemplated.

Furthermore, the figures herein are intended more as functional description of the various features which may be present in a set of servers than as a structural schematic of the embodiments described herein. In practice, and as recognized by those of ordinary skill in the art, items shown separately could be combined and some items could be separated. For example, some items shown separately in the Figures could be implemented on single servers and single items could be implemented by one or more servers. The actual number of servers and how features are allocated among them will vary from one implementation to another, and may depend in part on the amount of data traffic that the system must handle during peak usage periods as well as during average usage periods.

What is claimed is:

1. A method, comprising:
    loading profile information for a first simulated subscriber identity module (SIM) associated with a foreign SIM profile;
    receiving a first authentication request for a SIM from a local communication network, wherein the first authentication request comprises a Ki authentication request;
    responding to the first authentication request by first switching control from a physical SIM to the first simulated SIM and then locally resolving the first authentication request using the first simulated SIM;
    establishing a data communication link via the first simulated SIM;
    locally loading profile information for a second simulated SIM associated with a local SIM profile;
    receiving a second authentication request for the second simulated SIM from the local communication network;
    determining whether the data communication link has timed out;
    establishing the data communication link via the first simulated SIM again by performing authentication for the first simulated SIM again;
    relaying the second authentication request to a remote server via the established data communication link;
    receiving an authentication response to the second authentication request from the remote server via the established data communication link; and
    responding to the second authentication request with the received authentication response.

2. The method of claim 1, wherein both the first and second simulated SIMs are configured to communicate with a communication network using a same MODEM.

3. The method of claim 1, further comprising switching from the first simulated SIM back to the first physical SIM card after responding to the second authentication request with the received authentication response.

4. The method of claim 1, further comprising:
    receiving a third authentication request for the second simulated SIM;
    establishing a second data communication link via the first simulated SIM;
    relaying the third authentication request to the remote server via the established second data communication link;
    receiving a second authentication response to the third authentication request from the remote server via the established second data communication link; and
    responding to the third authentication request with the received second authentication response.

5. The method of claim 4, further comprising restarting the third authentication request by transmitting a time-out indication prior to relaying the third authentication request to the remote server via the established second data communication link.

6. The method of claim 1, wherein the first and second authentication requests are Ki authentication requests.

7. The method of claim 1, wherein the profile information for the first simulated SIM is associated with a foreign SIM profile, and the profile information for the second simulated SIM is associated with a local SIM profile.

8. The method of claim 1, wherein the first simulated SIM is subject to roaming charges.

9. A wireless communications device, comprising one or more processors configured to:
    load profile information for a first simulated subscriber identity module (SIM) associated with a foreign SIM profile;
    receive a first authentication request for a SIM from a local communication network, wherein the first authentication request comprises a Ki authentication request;
    respond to the first authentication request by first switching control from a physical SIM to the first simulated SIM and then locally resolving the first authentication request using the first simulated SIM;

establish a data communication link via the first simulated SIM;

locally load profile information for a second simulated SIM associated with a local SIM profile;

receive a second authentication request for the second simulated SIM from the local communication network;

determine whether the data communication link has timed out;

establish the data communication link via the first simulated SIM again by performing authentication for the first simulated SIM again;

relay the second authentication request to a remote server via the established data communication link;

receive an authentication response to the second authentication request from the remote server via the established data communication link; and respond to the second authentication request with the received authentication response.

10. The wireless communication device of claim 9, wherein the one or more processors are further configured to:

receive a third authentication request for the second simulated SIM;

establish a second data communication link via the first simulated SIM;

restart the third authentication request by transmitting a time-out indication;

relay the third authentication request to the remote server via the established second data communication link;

receive a second authentication response to the third authentication request from the remote server via the established second data communication link; and responding to the third authentication request with the received second authentication response.

11. The communication device of claim 9, wherein both the first and second simulated SIMs are configured to communicate with a communication network using a same MODEM.

12. The communication device of claim 9, wherein the one or more processors are further configured to switch from the first simulated SIM back to the first physical SIM card after responding to the second authentication request with the received authentication response.

13. The communication device of claim 10, wherein the one or more processors are configured to restart the third authentication request by transmitting a time-out indication prior to relaying the third authentication request to the remote server via the established second data communication link.

14. The communication device of claim 9, wherein the second authentication request is a Ki authentication request.

15. The communication device of claim 9, wherein the profile information for the first simulated SIM is associated with the foreign SIM profile, and the profile information for the second simulated SIM is associated with the local SIM profile.

* * * * *